(12) United States Patent
Coronado et al.

(10) Patent No.: US 11,828,052 B2
(45) Date of Patent: *Nov. 28, 2023

(54) UNIVERSAL HEIGHT ABSORBING TOILET SEAL

(71) Applicant: Coflex S.A. de C.V., Nuevo Leon (MX)

(72) Inventors: Eduardo Coronado, Nuevo Leon (MX); Pedro Gonzalez, Nuevo Leon (MX); Adam Robert Sampson, Ramona, CA (US); Tuan Van Le, Fountain Valley, CA (US); Krishnaditya Arkalgud, Oceanside, CA (US)

(73) Assignee: Coflex S.A. de C.V., Nuevo Leon (MX)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,260

(22) Filed: Feb. 17, 2022

(65) Prior Publication Data

US 2022/0170254 A1 Jun. 2, 2022

Related U.S. Application Data

(63) Continuation of application No. 16/154,028, filed on Oct. 8, 2018, now Pat. No. 11,268,270, which is a continuation-in-part of application No. 15/699,211, filed on Sep. 8, 2017, now Pat. No. 10,119,263, which is a continuation of application No. 14/622,241, filed on Feb. 13, 2015, now Pat. No. 9,783,976.

(60) Provisional application No. 61/979,658, filed on Apr. 15, 2014.

(51) Int. Cl.
*E03D 11/16* (2006.01)
*F16J 15/00* (2006.01)

(52) U.S. Cl.
CPC .............. *E03D 11/16* (2013.01); *F16J 15/00* (2013.01)

(58) Field of Classification Search
CPC ........................................................ E03D 11/16
USPC ............................................... 4/252.5, 252.6
See application file for complete search history.

(56) References Cited

U.S. PATENT DOCUMENTS

| | | | |
|---|---|---|---|
| 2,447,712 A | 8/1948 | Nathan | |
| 3,579,670 A | 5/1971 | Frank | |
| 3,967,326 A | 7/1976 | Tammen | |
| 4,090,267 A | 5/1978 | Cuschera | |
| 5,185,890 A | 2/1993 | Dismore et al. | |
| 5,432,957 A | 7/1995 | Fernie et al. | |

(Continued)

FOREIGN PATENT DOCUMENTS

| | | |
|---|---|---|
| BR | MU09000353 | 1/2011 |
| BR | PI0903324 | 10/2011 |
| CN | 2412049 | 12/2000 |

*Primary Examiner* — Lauren A Crane
(74) *Attorney, Agent, or Firm* — BAKER & MCKENZIE

(57) ABSTRACT

A toilet seal for sealing between a plumbing fixture discharge and a waste drainpipe outlet is described. The toilet seal comprises a flange member having an inwardly extending flexible lip. A flexible sleeve extends downwardly from the flange member. The toilet seal further includes a compressible member having an upper surface disposed adjacent to a lower surface of the flange member. The compressible member further has a lower surface and a plurality of ridges extend downwardly from the lower surface of the compressible member.

15 Claims, 17 Drawing Sheets

(56) References Cited

U.S. PATENT DOCUMENTS

| | | | |
|---|---|---|---|
| 5,695,222 A | 12/1997 | Hodges | |
| 5,862,533 A | 1/1999 | Johnson et al. | |
| 6,745,408 B2 | 6/2004 | Spells, Sr. | |
| 7,240,378 B2 | 7/2007 | Long et al. | |
| 7,694,474 B1 | 4/2010 | Stahl | |
| 8,875,320 B2 | 11/2014 | Penunuri et al. | |
| 2010/0088811 A1 | 4/2010 | Coronado et al. | |
| 2011/0131715 A1* | 6/2011 | Culwell | E03D 11/16 4/252.5 |
| 2011/0185488 A1 | 8/2011 | Miller et al. | |
| 2013/0227772 A1 | 9/2013 | Schuster | |
| 2015/0135421 A1 | 5/2015 | Guthrie | |

* cited by examiner

UNIVERSAL HEIGHT ABSORBING TOILET SEAL

CROSS-REFERENCE TO RELATED APPLICATIONS

This application is a continuation application of U.S. Ser. No. 16/154,028, filed on Oct. 8, 2018, which is a continuation-in-part application of U.S. Ser. No. 15/699,211 that issued on Nov. 6, 2018 as U.S. Pat. No. 10,119,263, which is a continuation application of U.S. Ser. No. 14/622,241 that issued on Oct. 10, 2017 as U.S. Pat. No. 9,783,976, which claims the priority of U.S. Provisional Application No. 61/979,658, filed Apr. 15, 2014, each of which is incorporated herein by reference in its entirety.

TECHNICAL FIELD

The present disclosure relates generally to a seal for connecting conduits, such as plumbing fixtures, to waste drain conduits, such as waste drainpipes. More particularly, the present disclosure is related to a universal height absorbing toilet seal that provides a sealed interconnection between a toilet and a toilet flange. Related methods for interconnecting conduits are also described.

BACKGROUND

Water closets, also called toilets, are waste disposal devices commonly installed in most bathrooms. These kinds of plumbing appliances generally include a water-storing receptacle called a water tank that is attached to a siphon seat-shaped bowl called a toilet bowl. Periodically, waste is removed from the toilet bowl by flushing, thereby allowing water to drain from the water tank through the toilet bowl and into a waste drainpipe. In order to work, however, the toilet must be connected to the waste drainpipe by fluid carrying conduits. Typically, the toilet bowl will sit flat on a finished flooring surface and will interface with a toilet flange that is connected to the waste drainpipe.

However, there are many variables associated with the toilet installation process that may or may not lead to a proper seal between the toilet and the toilet flange. The toilet flange may interconnect with the waste drainpipe by either fitting inside or outside the waste drainpipe, and the toilet flange may have a variety of diameters, such as a diameter of 3 inches or 4 inches. Thus, there are four, or more, different types of toilet flanges that may be used, each of which requires its own installation considerations.

In addition to the four different types of toilet flanges, there are additional installation variables related to height differences between the surface of the toilet flange and the finished flooring surface. The toilet flange may rest on top of the finished flooring surface, may be flush with the finished flooring surface, or may sit below the finished flooring surface. Each toilet bowl may also have a different toilet lip height that may require different installation techniques to create a desirable seal between the toilet and the toilet flange.

As a result, because of the different heights of toilet flanges, floor levels, and toilet lips, wax seals and/or modification of the waste drainpipes are typically needed to create a desirable seal between the toilet and the toilet flange. The wax seals are typically a uniform thickness and proper sealing often requires multiple wax seals in order to create a seal between the toilet and the toilet flange. However, the wax seals do not provide sufficient feedback to an installer during installation and once the toilet is placed over the toilet flange, the installer cannot see if a proper seal has been formed and is forced to rely only on tactile feel to determine if there is a proper seal. Without compression of the wax seals, it can be difficult to determine if a proper seal has been created. These wax seals are also not reliable because the seal connection is not strong enough to prevent leakage and associated odors, and oftentimes they can be expensive and inefficient due to delays in the installation process. Further, once the wax seals are set, they may not be able to be reset in a new position.

Therefore, an improved sealing system for addressing the above-described problems are desired. Related methods for installing a seal between the toilet and the toilet flange are also desired.

BRIEF SUMMARY

Disclosed herein is an exemplary embodiment of a universal height absorbing toilet seal flange system for providing a desirable seal between a toilet and a toilet flange as well as a conduit between a plumbing fixture discharge and a waste drainpipe outlet. The system may comprise a flexible sleeve, a compression member, one or more compressible spacers, and/or one or more rigid spacers.

DETAILED DESCRIPTION

Various aspects of a universal height absorbing toilet seal and related methods for installing a universal height absorbing toilet seal between a toilet and a toilet flange according to the present disclosure are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

Figure 1:
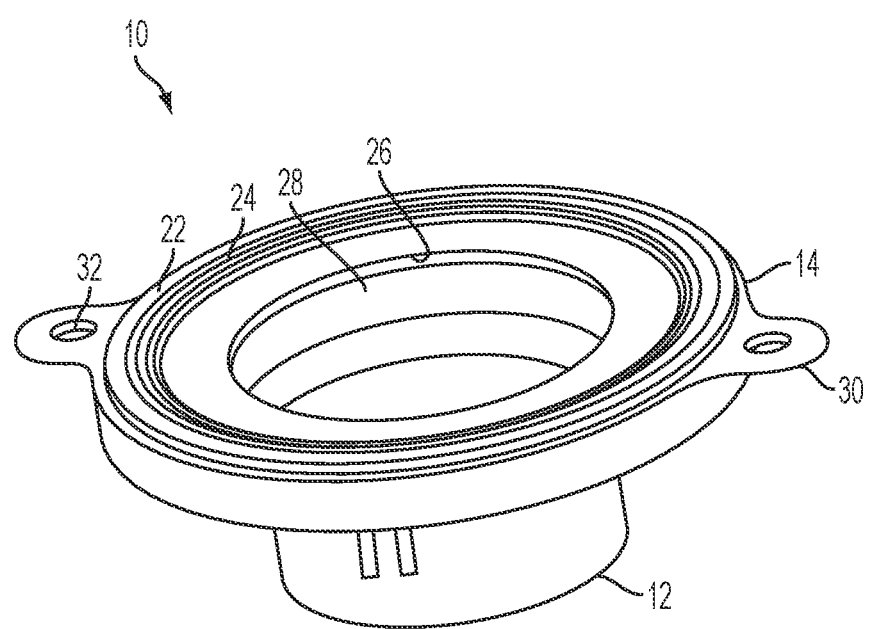
FIG. 1 illustrates a perspective view of a toilet seal according to one embodiment of the present disclosure.
Figure 2:
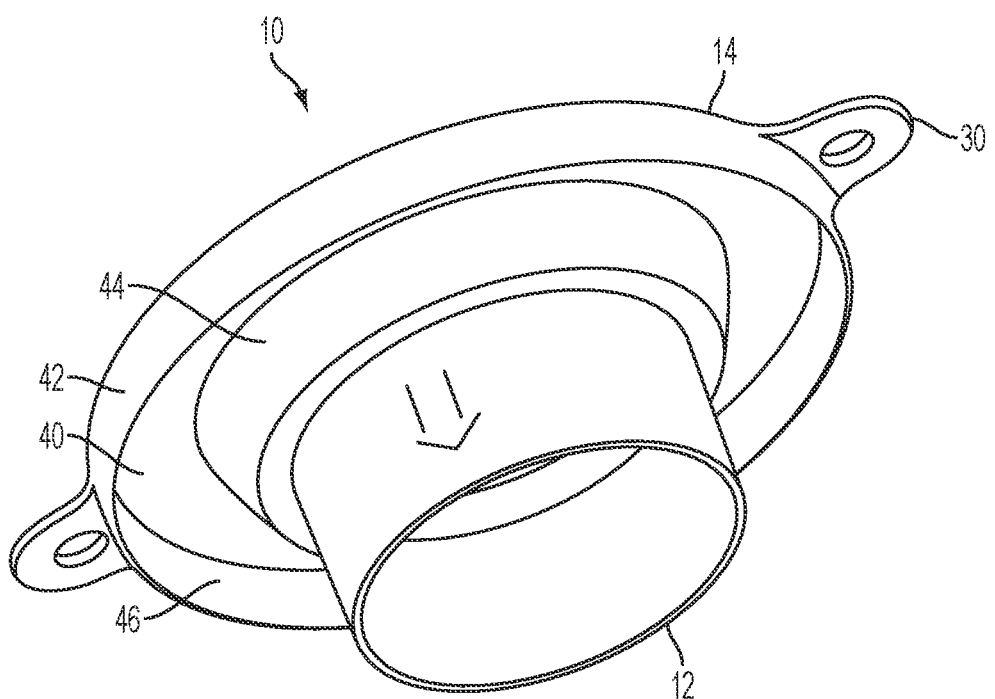
FIG. 2 illustrates a bottom perspective view of the toilet seal of FIG. 1.
Figure 3:
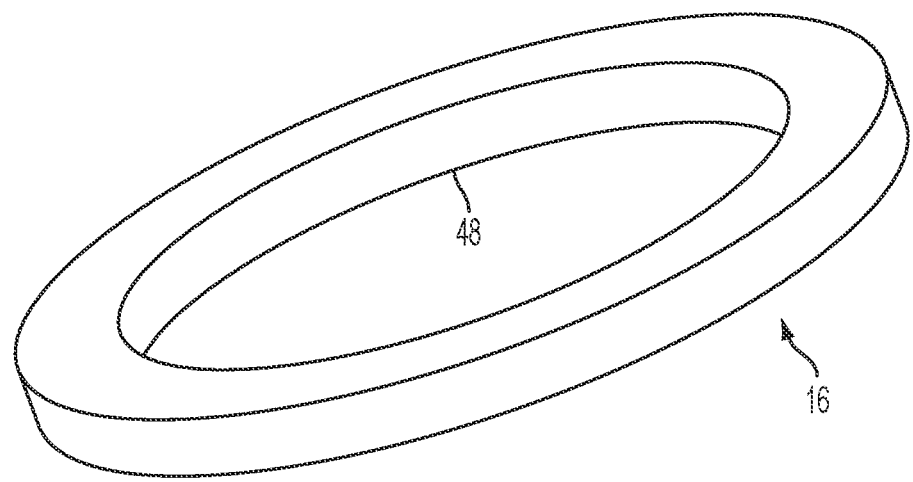
FIG. 3 illustrates a compressible member for use with the toilet seal of FIG. 1.

Referring to FIGS. 1-3, a universal height absorbing toilet seal 10 according to the present disclosure includes a flexible sleeve 12 depending downwardly from a flange member 14, and a compressible member 16 disposed underneath the flange member. One or more compressible spacers and/or one or more rigid spacers may optionally be provided with the seal 10 as will be described. In some embodiments, the height absorbing seal 10 is made from a flexible material, such as rubber, foam or polyvinyl chloride (commonly referred to as "PVC").

The flange member 14 includes an upper surface 22 that may comprise one or more seals 24 and an inwardly extending flexible lip 26 that surrounds an aperture 28 defined through the seal 10. In embodiments where multiple seals 24 are disposed along the upper surface 22 of the seal 10, the seals may be disposed concentrically relative to one another. The concentric seals 24 may comprise ring-shaped ridges that extend from the upper surface 22 of the seal 10. The one or more concentric seals 24 are operable to create a seal against a bottom surface of the toilet when the toilet is installed over the universal height absorbing toilet seal 10. In one embodiment, the universal height absorbing toilet seal 10 may comprise three concentric seals 24.

The height absorbing seal 10 may further comprise one or more optional tabs 30 extending from the upper surface 22 that include setting holes 32 defined therethrough. The setting holes 32 may receive fasteners (not shown) for securing the universal height absorbing toilet seal between the toilet and the toilet flange and waste drainpipe outlet. In one embodiment, two tabs may be provided that are spaced 180° apart from each other about an outer circumference of the height absorbing seal 10.

The flexible sleeve 12 may accommodate varying diameters of waste drainpipe outlets and/or toilet flanges. In one embodiment, a diameter of the inner aperture 28 at the upper surface 22 may be substantially equal to or slightly larger than a diameter of the flexible sleeve, thus defining a conduit for waste to flow from the plumbing fixture discharge, through the universal height absorbing toilet seal 10 and toilet flange, and into the waste drainpipe outlet.

Referring to FIG. 2, the height absorbing seal 10 includes a lower surface 40, which is defined opposite the upper surface 22. The upper surface 22 terminates at an outer circumference of the height absorbing seal 10. The height absorbing seal 10 further includes a downwardly depending annular portion 42, which is substantially orthogonal to the upper surface 22. The height absorbing seal 10 further includes a radiused wall 44, which extends from the lower surface 40 to the flexible sleeve 12. The diameter of the wall 44 is radiused from a larger diameter proximate to the lower surface 40 to a smaller diameter proximate to the flexible sleeve 12. The lower surface 40, annular portion 42 and radiused wall 44 cooperate to define a cavity 46. The cavity 46 may receive the compressible member 16 (FIGS. 3-4).

Figure 4:
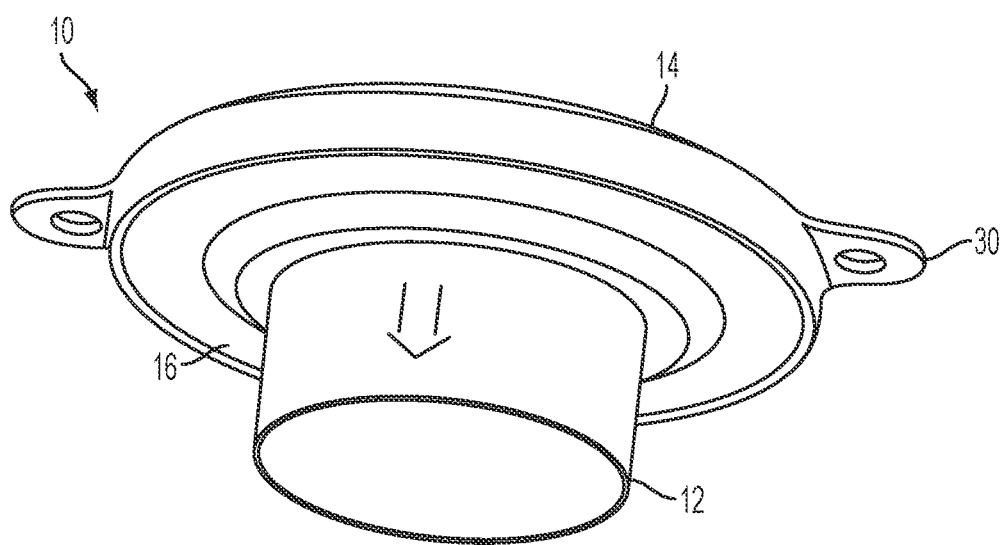
FIG. 4 illustrates a bottom perspective view of the toilet seal of FIG. 1 with the compressible member.
Figure 5:
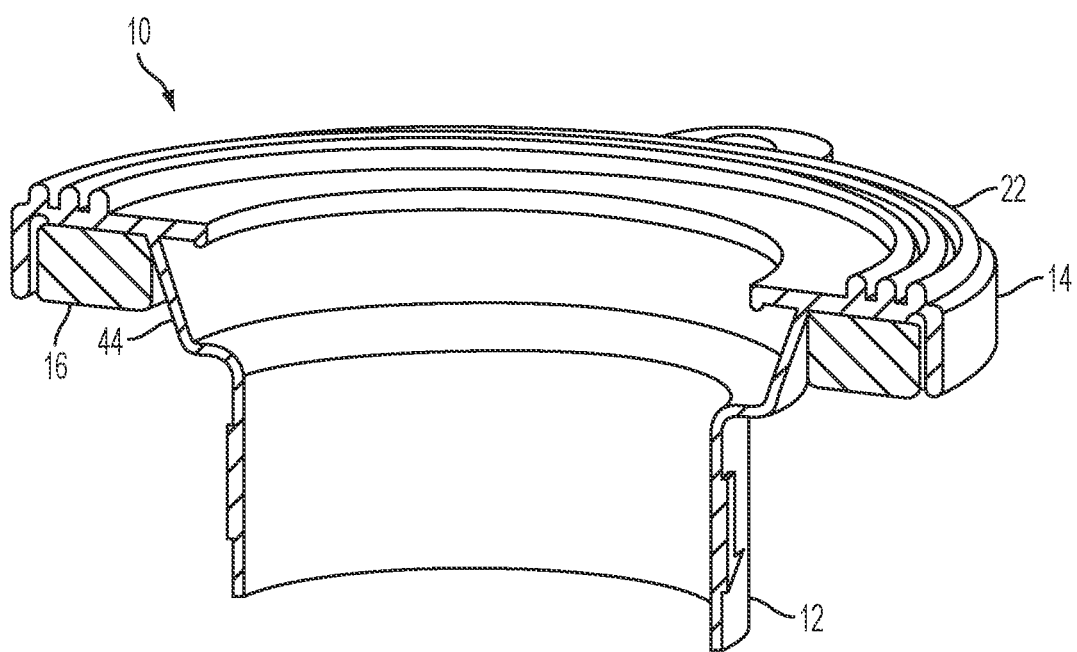
FIG. 5 illustrates a sectional view of the toilet seal of FIG. 4.

Referring to FIGS. 3-5, the universal height absorbing toilet seal 10 may further comprise the compressible member 16. The compressible member 16 may comprise an internal aperture 48 defined therethrough operable to receive the flexible sleeve 12 and may be sized and shaped to be received within the cavity 46 defined in height absorbing seal 10. The compressible member 16 may be made from foam or a similar material and may be permanently affixed to the lower surface 40 of the seal 10 within the cavity 46 or may be removably connected to the seal 10. The compressible member 16 may be operable to be compressed between the height absorbing seal 10 and a top surface of a toilet flange 50 inserted into a waste drainpipe 51 (see, e.g., FIG. 13).

Figure 6:
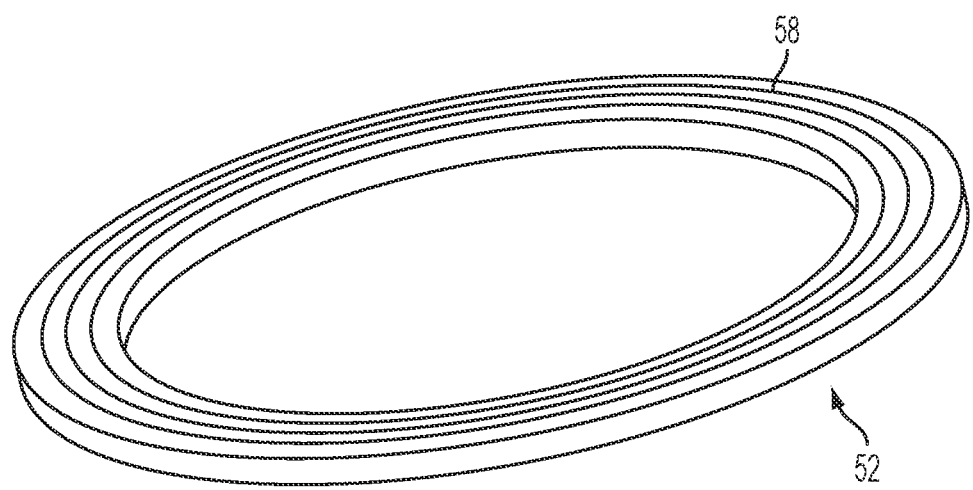
FIG. 6 illustrates a perspective view of a rigid spacer for use with the toilet seal of FIGS. 1 and 4.
Figure 7:
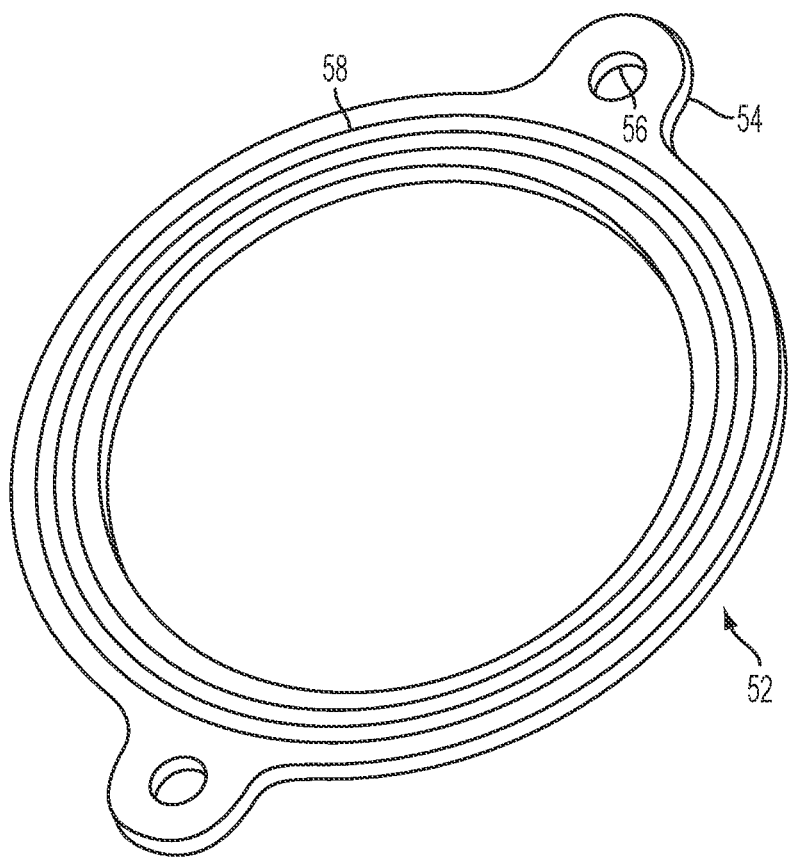
FIG. 7 illustrates a top perspective view of another embodiment of a rigid spacer for use with the toilet seal of FIGS. 1 and 4.
Figure 8:
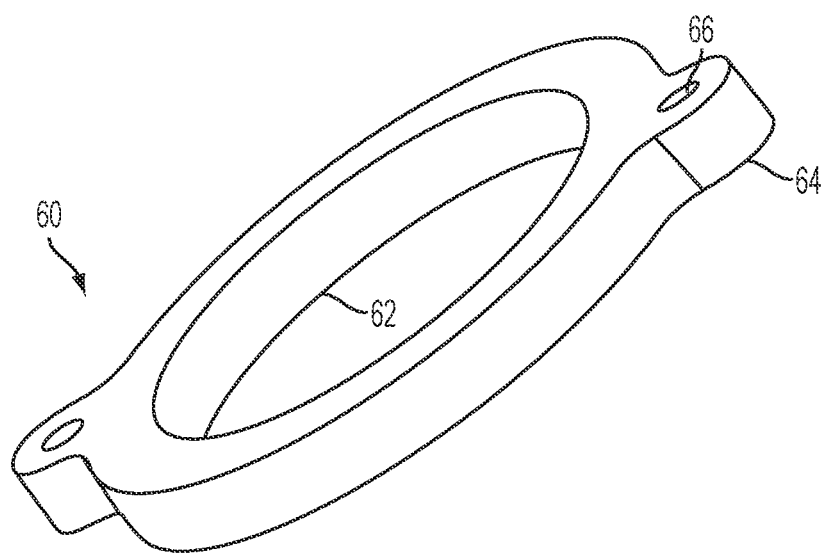
FIG. 8 illustrates a perspective view of a compressible member for use with the toilet seal of FIGS. 1 and 4.

Referring to FIG. 6, the universal height absorbing toilet seal 10 may further comprise one or more modular rigid spacers 52. In some embodiments, the rigid spacer 52 may be modified to include a pair of tabs 54 defining setting holes 56 (FIG. 7) for receiving securing fasteners (not shown). In such embodiments, the tabs 54 may be situated 180° from each other about an outer circumference of the rigid spacer 52 and may be operable to align with the one or more tabs 30 of the height absorbing seal 10. The rigid spacer 52 may be formed of a variety of materials, such as rigid plastic or metal.

The one or more rigid spacers 52 may be used to raise the upper surface 22 of the height absorbing seal 10 relative to the toilet flange 50 and is operable to interact with and create a seal with the compressible member 16. Like the compressible member 16, the one or more rigid spacers 52 may include an inner aperture defined therethrough for receiving the flexible sleeve 12. In one embodiment, the rigid spacer 52 may comprise one or more concentric seals 58 that may take the form of ring-shaped ridges that extend from an upper surface of the rigid spacer 52 and may be located proximate to and centered about the inner aperture. The concentric seals 58 are operable to create a seal against a bottom surface of the compressible member 16. In one embodiment, the rigid spacer 52 may comprise three concentric seals 58.

The universal height absorbing toilet seal 10 may further comprise one or more modular compressible spacers 60 that are positionable below the rigid spacer 52. Similar to the one or more rigid spacers 52, the one or more compressible spacers 60 may also be used to raise the upper surface 22 of the height absorbing toilet seal 10 relative to the toilet flange 50. In some embodiments, the modular compressible spacers 60 are of similar construct (e.g., made of foam) to the compressible member 16 disposed within the cavity 46. Each modular compressible spacer 60 may be operable to interact with and create a seal with the rigid spacer 52, the toilet flange 50, and/or another compressible spacer. Each compressible spacer may similarly comprise an inner aperture 62 defined therethrough for receiving the flexible sleeve 12.

The compressible spacer 60 may further comprise one or more tabs 64 with optional setting holes 66 that are operable to receive securing fasteners (not shown). In one embodiment, the compressible spacer 60 may include two tabs situated 180° from each other about an outer circumference of the compressible spacer and may be operable to align with the two tabs 30 of the height absorbing toilet seal 10 and the two tabs 54 of the rigid spacer 52.

Figure 9:
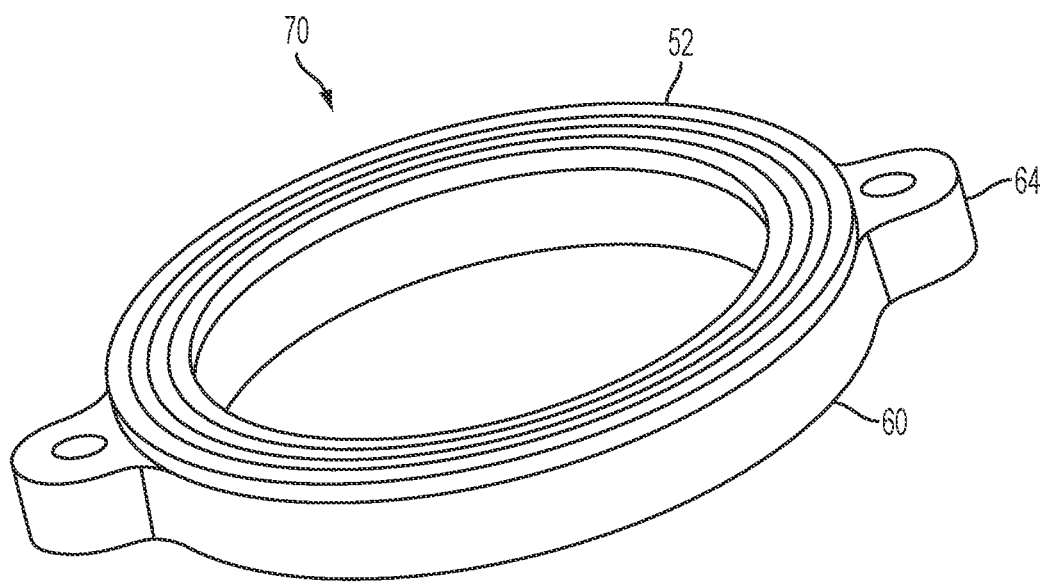
FIG. 9 illustrates a perspective view of a compressible member with rigid spacer for use with the toilet seal of FIGS. 1 and 4.

Referring to FIG. 9, one rigid spacer 52 may be affixed to one modular compressible spacer 60 in order to create a modular rigid plus compressible spacer 70, which may be used to raise the upper surface 22 of the height absorbing toilet seal 10 relative to the toilet flange 50. In the embodiment depicted in FIG. 9, the rigid spacer 52 may not have tabs while the compressible spacer 60 may have tabs 64; however various combinations of tabs on the rigid spacer and the compressible spacer are contemplated.

Figure 10:
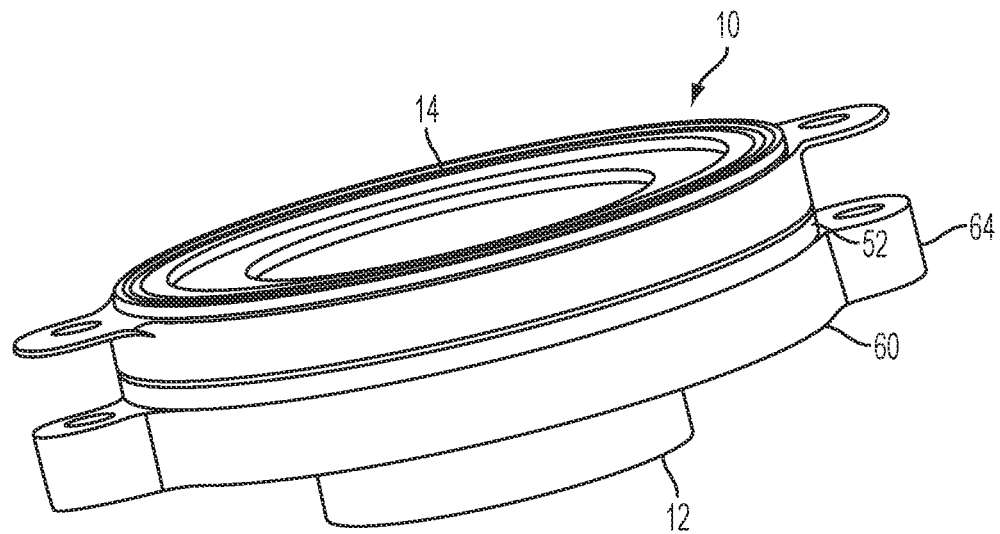
FIG. 10 illustrates a perspective view of the toilet seal of FIG. 4 having a rigid spacer and compressible member.
Figure 11:
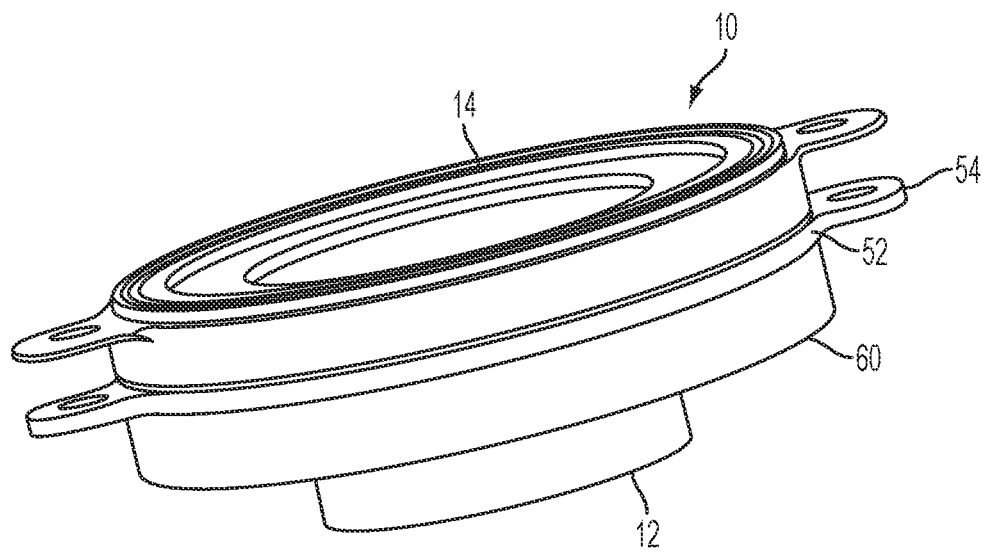
FIG. 11 illustrates a perspective view of the toilet seal of FIG. 4 having an alternative embodiment of a rigid spacer and compressible member.
Figure 12:
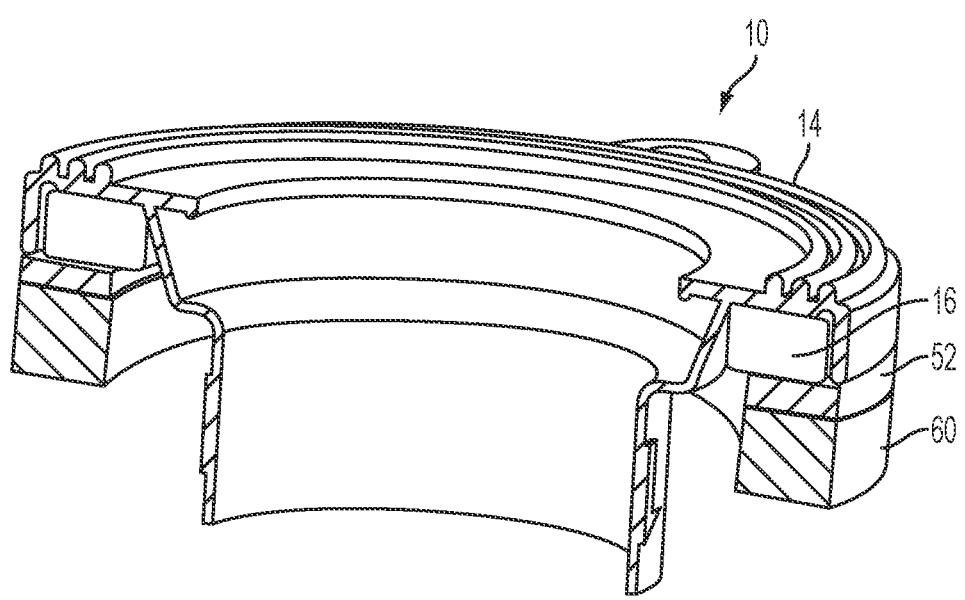
FIG. 12 illustrates a sectional view of the toilet seal of FIG. 10.

Accordingly, in some embodiments, and with reference to FIGS. 10-12, the height absorbing toilet seal 10 may include the flexible sleeve 12, the flange member 14 and the compressible member 16 in combination with the rigid spacer 52 and/or the modular compressible spacer 60. The embodiment of FIG. 10 illustrates the compressible member 60 having tabs 64, while the embodiment of FIG. 11 illustrates the rigid spacer having tabs 54. Of course, other embodiments are contemplated in which each of the rigid spacer 52 and compressible member 60 have tabs and in which no tabs are provided. Also, additional rigid spacers 52 and compressible members 60 may be provided depending on the height adjustment desired.

Referring to FIGS. 13-17, in operation, the toilet flange 50 may be inserted into the waste drainpipe outlet 51 in such an arrangement where an upper portion 80 of the toilet flange may be higher than, level with, or lower than a finished flooring surface 82. Typically, the waste drainpipe outlet 51 does not extend above a subflooring region 84. Accordingly, the height absorbing toilet seal 10 may be used to create a sealed conduit in conjunction with the waste drainpipe outlet 51 and thus a desirable seal between a toilet 86 and the toilet flange 50.

Figure 13:
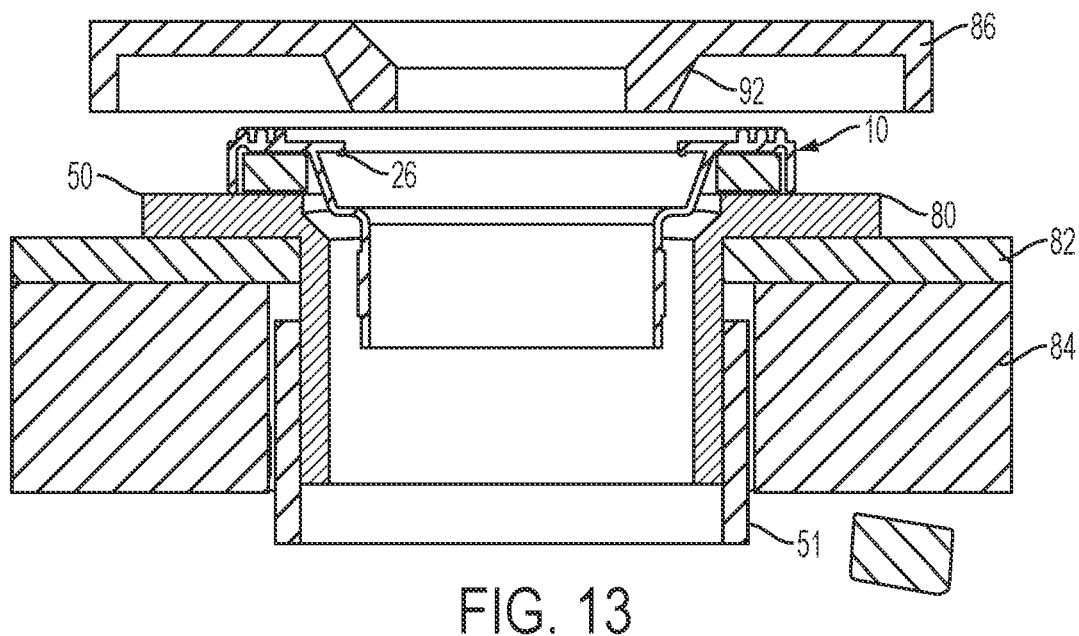
FIG. 13 illustrates a sectional view of the toilet seal of FIG. 4 disposed between a plumbing fixture discharge and a waste drainpipe outlet.
Figure 14:
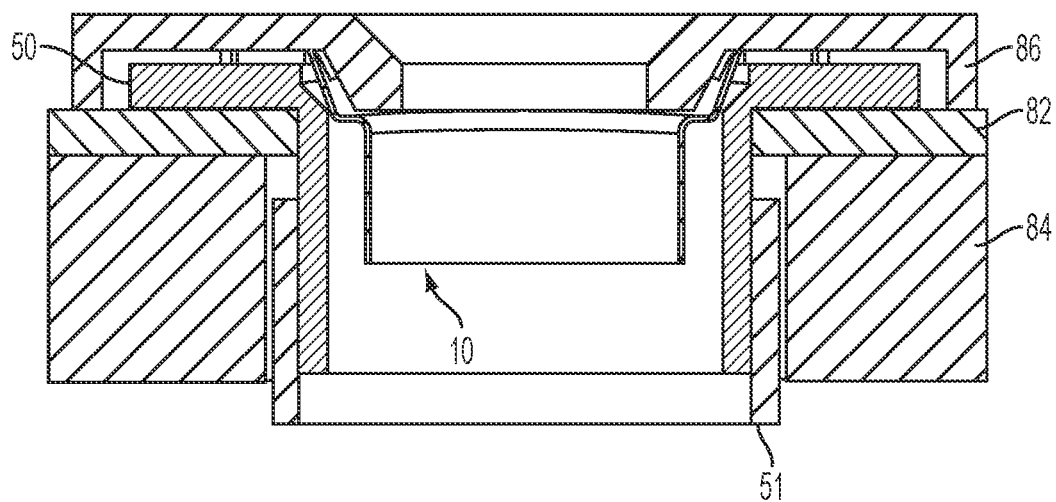
FIG. 14 illustrates a sectional view of the toilet seal of FIG. 4 with a plumbing fixture discharge disposed against the toilet seal.

In some embodiments, such as the one depicted in FIGS. 13-14, the height absorbing seal 10 may be used without rigid or modular spacers 52, 60. For example, in some scenarios, the toilet flange 50 will be disposed above the finished flooring surface 82. The height absorbing seal 10 may be disposed into the toilet flange 50 such that the flexible sleeve 12 extends in a downward direction into the toilet flange. The flange member 14 and compressible member 16 of the height absorbing toilet seal 10 may thus rest on an upper surface of the toilet flange 50. During installation, a horn section 92 of the toilet 86 may then be inserted into the height absorbing seal 10 such that it comes into contact with the inwardly extending flexible lip 26. As a result, the flexible lip 26 flexes downward when it comes in engagement with the toilet horn 92 and the flange member 14 and compressible member 16 are compressed in engagement with the toilet flange 50, thus providing a desirable seal. Further, the concentric seals 24 disposed along the upper surface 22 of the flange member 14 of the height absorbing seal 10 come into sealed engagement with a lower surface of the toilet 86.

Figure 15:
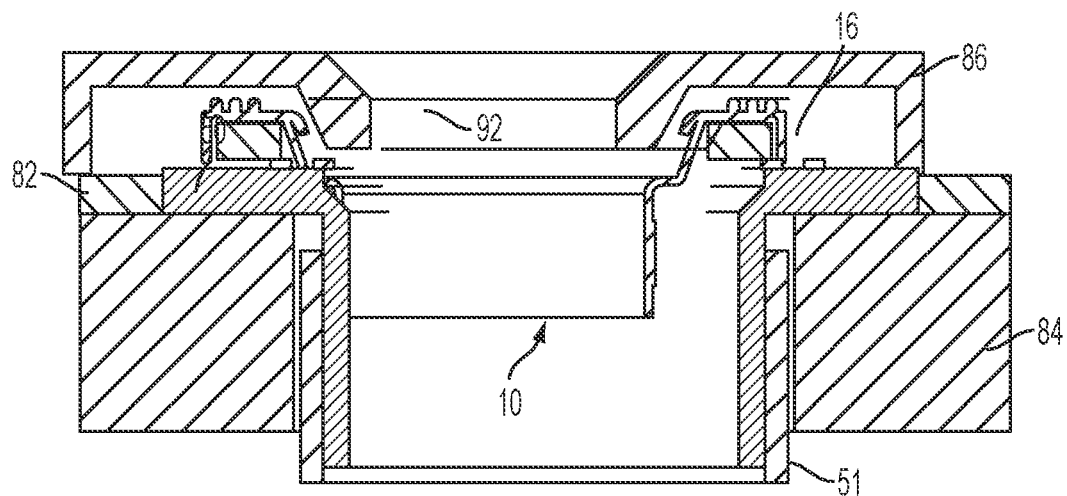
FIG. 15 illustrates a sectional view of the toilet seal of FIG. 4 having a rigid spacer and disposed between a plumbing fixture discharge and a waste drainpipe outlet.

Referring to FIG. 15, the height absorbing seal 10 may be modified to include a rigid spacer 52 to accommodate for an increased height between the lower surface of toilet 86 and the toilet flange 50. This increased height may be due to a toilet having an increased size along a lower portion thereof, the toilet flange being disposed flush with the finished flooring or combinations of such factors. In practice, the horn section 92 of the toilet 86 may be inserted into the height absorbing seal 10 such that it comes into contact with the inwardly extending flexible lip 26. As a result, flexible lip 26 flexes downward when it comes in engagement with the toilet horn 92 and the flange member 14 and compressible member 16 are compressed in engagement with the rigid spacer 52, which is disposed between the compressible member 16 and the toilet flange 50, thus providing a desirable seal. Further, the concentric seals 24 disposed along the upper surface 22 of the flange member 14 of the height absorbing seal 10 come into sealed engagement with a lower surface of the toilet 86. The concentric seals 58 of the rigid spacer 52 also seal into the compressible member 16 further strengthening the seal.

Figure 16:
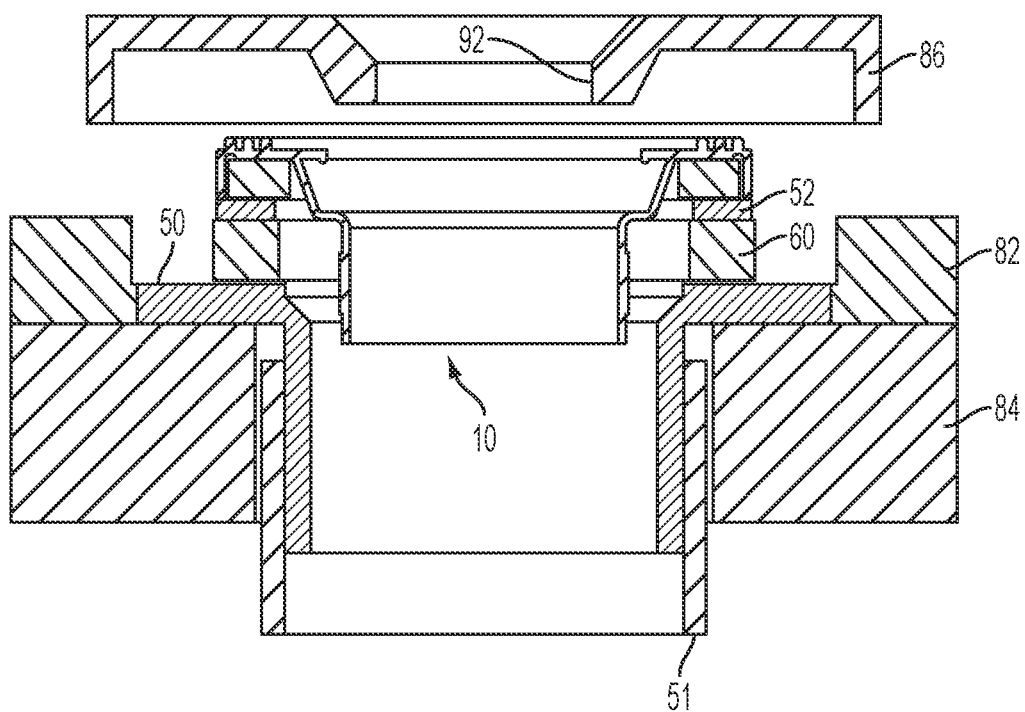
FIG. 16 illustrates a sectional view of the toilet seal of FIG. 4 having a rigid spacer and a compressible member and disposed between a plumbing fixture discharge and a waste drainpipe outlet.
Figure 17:
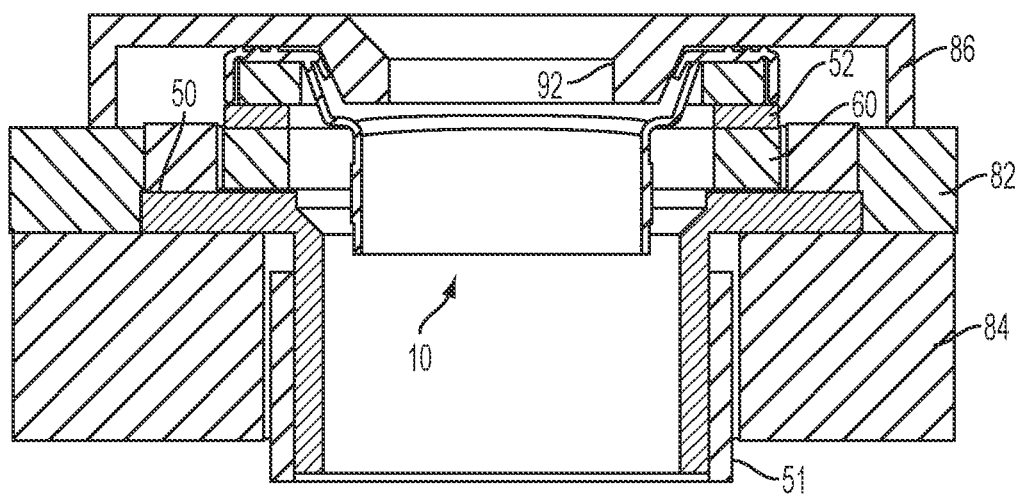
FIG. 17 illustrates a sectional view of the toilet seal of FIG. 4 having a rigid spacer and a compressible member with a plumbing fixture discharge disposed against the toilet seal.

In further embodiments, and with reference to FIGS. 16-17, the height absorbing seal 10 may be further modified to include both a rigid spacer 52 and a modular compressible member 60 to accommodate for situations where there is an increased distance between the lower surface of the toilet 86 and the toilet flange 50. For example, the toilet flange 50 may be disposed against the subflooring region 84, while the toilet 86 rests against the finished flooring surface 82. In such arrangements, the height absorbing toilet seal may be modified to include both a rigid spacer 52 and a modular compressible member 60 to accommodate for the increased height between the lower surface of toilet 86 and the toilet flange 50. In some embodiments, the rigid spacer 52 may be coupled to the modular compressible member 60 to form a unitary rigid spacer/modular compressible member combination.

In practice, the horn section 92 of the toilet 86 may be inserted into the height absorbing seal 10 such that it comes into contact with the inwardly extending flexible lip 26. As a result, the flexible lip 26 flexes downward when it comes in engagement with the toilet horn 92 and the flange member 14 and compressible member 16 are compressed in engagement with the rigid spacer 52 and the modular compressible member 60. The modular compressible member 60 is also compressed against the upper surface of the toilet flange, thus providing a desirable seal. Further, the concentric seals 24 disposed along the upper surface 22 of the flange member 14 of the height absorbing seal 10 come into sealed engagement with a lower surface of the toilet 86. The concentric seals 58 of the rigid spacer 52 also seal into the compressible member 16 further strengthening the seal.

Figure 18:
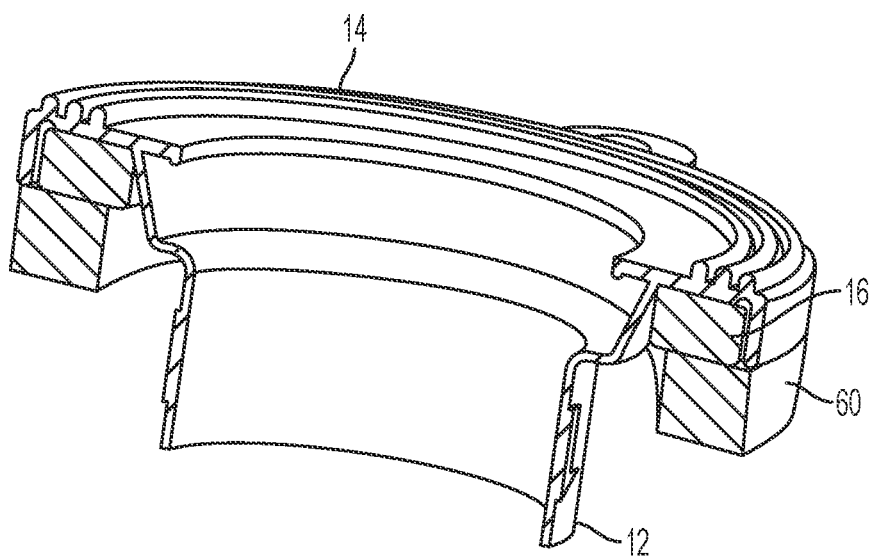
FIG. 18 illustrates a sectional view of the toilet seal of FIG. 4 having a compressible member according to another embodiment of the present disclosure.

Referring to FIG. 18, in yet another embodiment, the height absorbing seal 10 may be modified to exclude the rigid spacer 52, yet include a modular compressible member 60. The height absorbing seal 10 of FIG. 18 thus provides a desired seal by sealing the concentric seals 24 against the lower surface of the toilet 86 and via compression of the compressible members 16, 60 against the upper surface of the toilet flange 50.

It is to be appreciated that installations involving taller toilets, toilet flanges sunk below the finished flooring surface, or taller finished flooring surfaces, one or more rigid spacers 52 and/or modular compressible spacers 60 may be added as needed to raise the level of the universal height absorbing toilet seal 10 relative to the toilet flange 50.

Advantageously, the universal height absorbing toilet seal 10 creates a desirable seal between the toilet 86 and the toilet flange 50 without the need for one or more wax rings. The universal height absorbing toilet seal 10 may be used with any type of toilet flange, all brands and models of toilets regardless of the height of the toilet, and works with toilet flanges sitting flush, above, or below the finished flooring surface. Further, during installation, the universal height absorbing toilet seal 10 can be moved to ensure a desirable seal and can be used more than once. In addition, the compressible nature of the universal height absorbing toilet seal 10 provides tactile feedback to the installer, ensuring that a proper seal has been created even when the toilet has been installed over the universal height absorbing toilet seal and the seal cannot be seen. The universal height absorbing toilet seal 10 also maintains sufficient support below the surface of the flexible sleeve 12 regardless of the number of rigid spacers 52 and/or modular compressible spacers 60 used.

Figure 19:
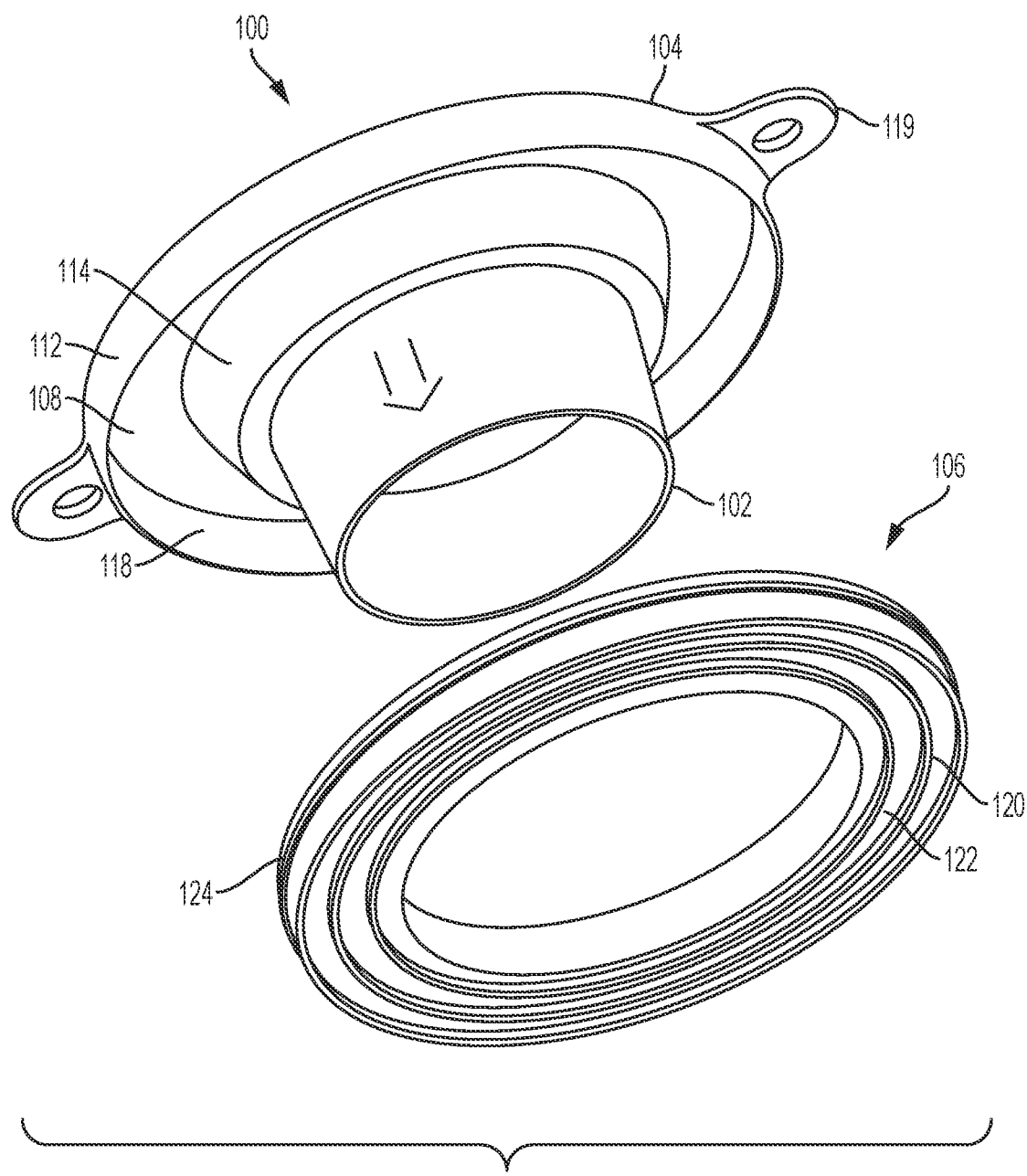
FIG. 19 illustrates an exploded view of a toilet seal according to another embodiment of the present disclosure.

FIG. 19 illustrates an alternative toilet seal 100 according to the present disclosure. The toilet seal 100 includes a flexible sleeve 102 depending downwardly from a flange member 104. In some embodiments, the sleeve 102 may be annular with a constant diameter, while in other embodiments, it may be tapered. The toilet seal 100 also includes a compressible member 106, which may be formed of a flexible material, such as rubber, foam or a flexible polyvinyl chloride (commonly referred to as "PVC"), and may take the shape of a ring. Forming the compressible member 106 of flexible PVC is particularly advantageous as the method of fabrication is via injection molding such that the piece is extruded from the mold in its final ring shape, whereas in other materials that are not produced via injection molding a ring is cut off from a blanket piece of material and the center of the ring is wasted.

The toilet seal includes a lower surface 108, which is defined opposite an upper surface. The upper surface terminates at an outer circumference of the toilet seal 100. The toilet seal 100 further includes a downwardly depending annular portion 112, which is substantially orthogonal to the upper surface. The toilet seal 100 further includes a radiused wall 114, which extends from the lower surface 108 to the flexible sleeve 102. The diameter of the wall 114 is radiused from a larger diameter proximate to the lower surface 108 to a smaller diameter proximate to the flexible sleeve 102. The lower surface 108, annular portion 112 and radiused wall 114 cooperate to define a cavity 118. The cavity 118 may receive the compressible member 106. The toilet seal 100 may further include a pair of ears 119, each having an orifice defined therethrough for receiving a fastener (not shown).

As shown in FIG. 19, the compressible member 106 includes a plurality of ridges 120 formed on a bottom side 122 of the compressible member. The ridges 120 assist the ability of the compressible member 106, or ring, to compress when the toilet is pushed down into the toilet seal 100. The compressible member 106 further includes a ridge 124 extending along the circumference of the compressible member. In this manner, the compressible member 106 need not be glued to the toilet seal 100, but rather the ridge 124 provides a gripping functionality to retain the compressible member within the cavity 118.

Figure 20:
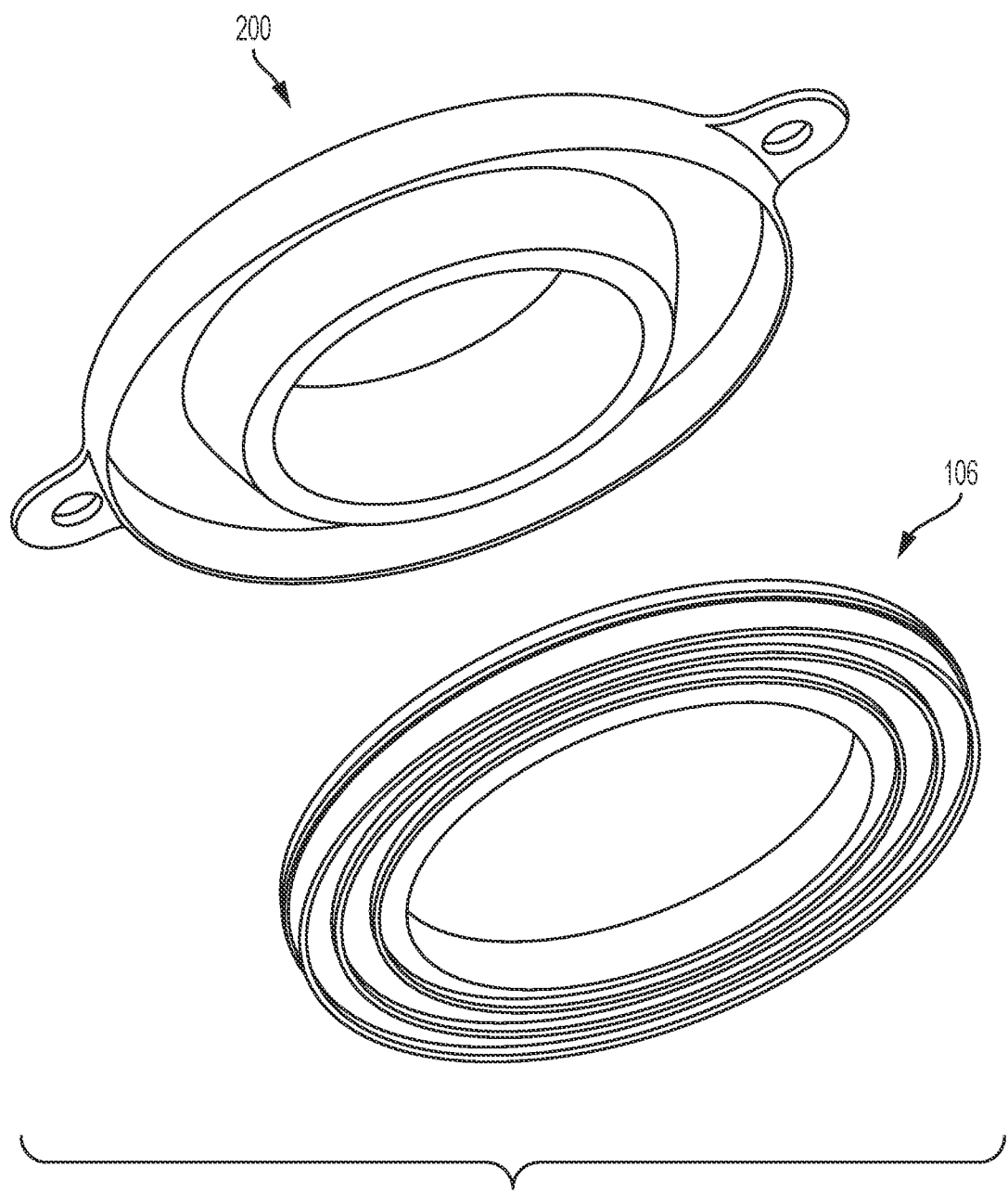
FIG. 20 illustrates an exploded view of a toilet seal according to another embodiment of the present disclosure.

Referring to FIG. 20, an alternative toilet seal 200 is depicted. The toilet seal 200 is substantially similar to the toilet seal of FIG. 19 with the exception that the flexible sleeve 102 has been removed. The toilet seal 200 may receive the compressible member 106 in a manner similar to that described with respect to FIG. 19.

The breadth and scope of the present disclosure should not be limited by any of the above-described exemplary embodiments, but should be defined only in accordance with the following claims and their equivalents. For example, in some embodiments, the height of the seals disclosed herein may be adjusted by providing an additional seal and stacking the additional seal on top of the original seal. In such embodiments, the additional seal may be of similar construct to the original seal. Also, in some embodiments, the downwardly depending annular portion 42 of the seal 10 may be removed, and thus the compressible member 16 is disposed adjacent to the lower surface 40 of the flange member 14. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. A toilet seal, comprising:
   a flange member having an inwardly extending flexible lip, the flange member having
      a flexible sleeve extending downwardly,
      an annular portion disposed radially outward from the flexible sleeve, and
      a plurality of tabs extending outwardly of the annular portion, the tabs each including an opening disposed radially outward of the annular portion and operable to receive a fastener to secure the toilet to a toilet flange; and
   a compressible member having an upper surface disposed adjacent to a lower surface of the flange member, an outer diameter of the compressible member being smaller than a diameter between the openings of the tabs of the flange member.

2. The toilet seal according to claim 1, wherein the flexible sleeve includes a radiused wall at an upper end of the flexible sleeve, the radiused wall coupled to the lower surface of the flange member.

3. The toilet seal according to claim 1, wherein an annular portion extends downwardly from the flange member, and wherein the lower surface of the flange member, the annular portion, and the sleeve cooperate to define a cavity.

4. The toilet seal according to claim 1, wherein the compressible member is formed of foam.

5. The toilet seal according to claim 1, wherein the compressible member is affixed to the flange member.

6. The toilet seal according to claim 1, further comprising a modular rigid spacer substantially concentric with and adapted to be positioned below the compressible member.

7. The toilet seal according to claim 6, wherein the modular rigid spacer comprises one or more raised ridges defining an annular seal extending upwardly from an upper surface of the modular rigid spacer.

8. The toilet seal according to claim 7, wherein the raised ridges of the modular rigid spacer are adapted to seal into the compressible member.

9. The toilet seal according to claim 6, wherein the modular rigid spacer comprises three concentric raised ridges.

10. The toilet seal according to claim 6, wherein the modular rigid spacer is formed of rigid plastic.

11. The toilet seal according to claim 1, wherein the compressible member is formed of moldable elastomeric material.

12. The toilet seal according to claim 1, wherein the flange member includes raised ridges extending from an upper surface of the flange member.

13. The toilet seal according to claim 1, further comprising a modular compressible member substantially concentric with and adapted to be positioned below the compressible member.

14. The toilet seal according to claim 13, further comprising a modular rigid spacer disposed between the compressible member and the modular compressible member.

15. The toilet seal according to claim 14, wherein the modular rigid spacer is coupled to the modular compressible member.

* * * * *